United States Patent
Dorrer (10) Patent No.: US 7,609,385 B2
(45) Date of Patent: Oct. 27, 2009

(54) METHOD AND APPARATUS FOR CHARACTERIZATION OF THE RESPONSE OF OPTICAL DEVICES

(75) Inventor: Christophe J. Dorrer, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 435 days.

(21) Appl. No.: 11/206,622

(22) Filed: Aug. 18, 2005

(65) Prior Publication Data

US 2007/0041021 A1 Feb. 22, 2007

(51) Int. Cl.
  *G01B 9/02* (2006.01)
(52) U.S. Cl. ..................................... 356/484
(58) Field of Classification Search ............. 356/484, 356/485, 489
  See application file for complete search history.

(56) References Cited

U.S. PATENT DOCUMENTS

| | | | |
|---|---|---|---|
| 7,239,369 B2 * | 7/2007 | Jacobs et al. ............... 355/53 |
| 7,298,489 B2 * | 11/2007 | Dorrer ........................ 356/450 |
| 2003/0053069 A1 * | 3/2003 | Motamedi et al. ........... 356/477 |
| 2003/0112442 A1 * | 6/2003 | Baney et al. ................ 356/477 |
| 2003/0223073 A1 * | 12/2003 | VanWiggeren et al. ...... 356/477 |
| 2003/0231315 A1 * | 12/2003 | Arbore et al. .............. 356/477 |
| 2004/0071472 A1 * | 4/2004 | Ito ............................. 398/161 |
| 2004/0246492 A1 * | 12/2004 | McAlexander ............. 356/484 |
| 2005/0185187 A1 * | 8/2005 | Dorrer ........................ 356/450 |
| 2005/0185255 A1 * | 8/2005 | Doerr et al. ................. 359/325 |
| 2006/0066838 A1 * | 3/2006 | Dorrer ........................ 356/73.1 |
| 2007/0110362 A1 * | 5/2007 | Shpantzer et al. ............ 385/15 |

OTHER PUBLICATIONS

F. Dorgeuille and F. Devaux, "On The Transmission Performances and the Chirp Parameter of a Multiple-Quantum-Well Electroabsorption Modulator," IEEE J. of Quantum Electronics, vol. 30, No. 11, Nov. 1994, pp. 2565-2571.

S.-C. Cao and J. C. Cartledge, "Measurement-Based Method for Characterizing the Intensity and Phase Modulation Properties of SOA-MZI Wavelength Converters," IEEE Photonics Tech. Let., vol. 14, No. 11, Nov. 2002, pp. 1576-1580.

F. Devaux et al., "Simple Measurement of Fiber Dispersion and of Chirp Parameter of Intensity Modulated Light Emitter," J. of Lightwave Tech., vol. 11, No. 12, Dec. 1993, pp. 1937-1940.

(Continued)

*Primary Examiner*—Michael A Lyons
*Assistant Examiner*—Jonathan M Hansen
(74) *Attorney, Agent, or Firm*—Wall & Tong, LLP (57) ABSTRACT

Techniques for characterizing the response of an optical device comprising modulating at least one signal using the device; coupling the modulated signal with a reference signal in a variety of ways; detecting the coupled signals; and obtaining the response of the modulator by analyzing the detected signals, are described. In a heterodyne embodiment, the method includes modulating a first optical signal using the optical device to produce a modulated first optical signal, the modulated first optical signal is combined with a second optical signal in a different spectral region; and the response of the optical device is determined from the intensity of the combined optical signal. A homodyne method using various splitting and recombining of the modulated optical signal with a reference signal is also described.

17 Claims, 5 Drawing Sheets

100

OTHER PUBLICATIONS

D. J. Krause and J. C. Cartledge, "Technique for Measuring the Optical Phase Transfer Function,", IEEE Photonics Technology Let., vol. 16, No. 8, Aug. 2004; pp. 1915-1917.

F. P. Romstad et al., "Heterodyne Technique for Measuring the Amplitude and Phase Transfer Functions of an Optical Modulator," IEEE Photonics Tech. Lett. vol. 14, No. 5, May 2002, pp. 621-623.

S. Yoshida et al., "InGaAIAs/InAIAs Multiquantum Well Electroabsorption Phase Modulator Module," Electronics Letters, Oct. 13, 1994, vol. 30, No. 21, pp. 1795-1796.

C. Dorrer and Inuk Kang, "Simultaneous Temporal Characterization of Telecommunication Optical Pulses and Modulators by Use of Spectrograms," Optics Letters, vol. 27, No. 15, Aug. 1, 2002, pp. 1315-1317.

C. Dorrer et al., "Measurement of Eye Diagrams and Constellation Diagrams of Optical Sources Using Linear Optics and Waveguide Technology," J. of Lightwave Technology, vol. 23, No. 1, Jan. 2005, pp. 178-186.

\* cited by examiner

METHOD AND APPARATUS FOR CHARACTERIZATION OF THE RESPONSE OF OPTICAL DEVICES

FIELD OF THE INVENTION

The invention is related to the field of optical telecommunications, and in particular, to method and apparatus for analyzing optical components.

BACKGROUND OF THE INVENTION

The measurement of the properties of optical devices is of high interest for the telecommunications community. Temporal modulators are routinely used to carve trains of optical pulses and encode data via amplitude or phase modulation. Devices such as semiconductor optical amplifiers are also used for amplification and processing of optical waves. The accurate description of the properties of a device, such as the amplitude and phase response versus the electrical or optical drive signal or the dependence between transmission and phase, is important to the understanding of the properties of the generated optical signals.

SUMMARY

Various deficiencies of the prior art are addressed by the present invention of methods and apparatus for characterization of the response of optical devices. In one embodiment, the invention includes modulating a first optical signal using an optical device to produce a modulated first optical signal. The modulated first optical signal is combined with a second optical signal. The first and second optical signals are associated with respective spectral regions. The intensity of the combined signals is measured and processed to yield the properties of the modulation.

Another embodiment of the invention provides for modulating a first optical signal using the optical device to produce a modulated first optical signal. The modulated first signal and a second signal are inputted into an optical hybrid structure. Two pairs of optical signals are outputted from the optical hybrid structure. Each pair of optical signals is sent to a balanced photodetector unit, and the response of the optical device is determined by combining the electrical signals generated by the two balanced photodetector units.

The invention further provides other methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of measuring arrangements for temporal modulators in the art of optical telecommunications; however, those skilled in the art and informed by the teachings herein will realize that the invention is also applicable to any apparatus and method that measures communications components of a communications network.

Figure 1:
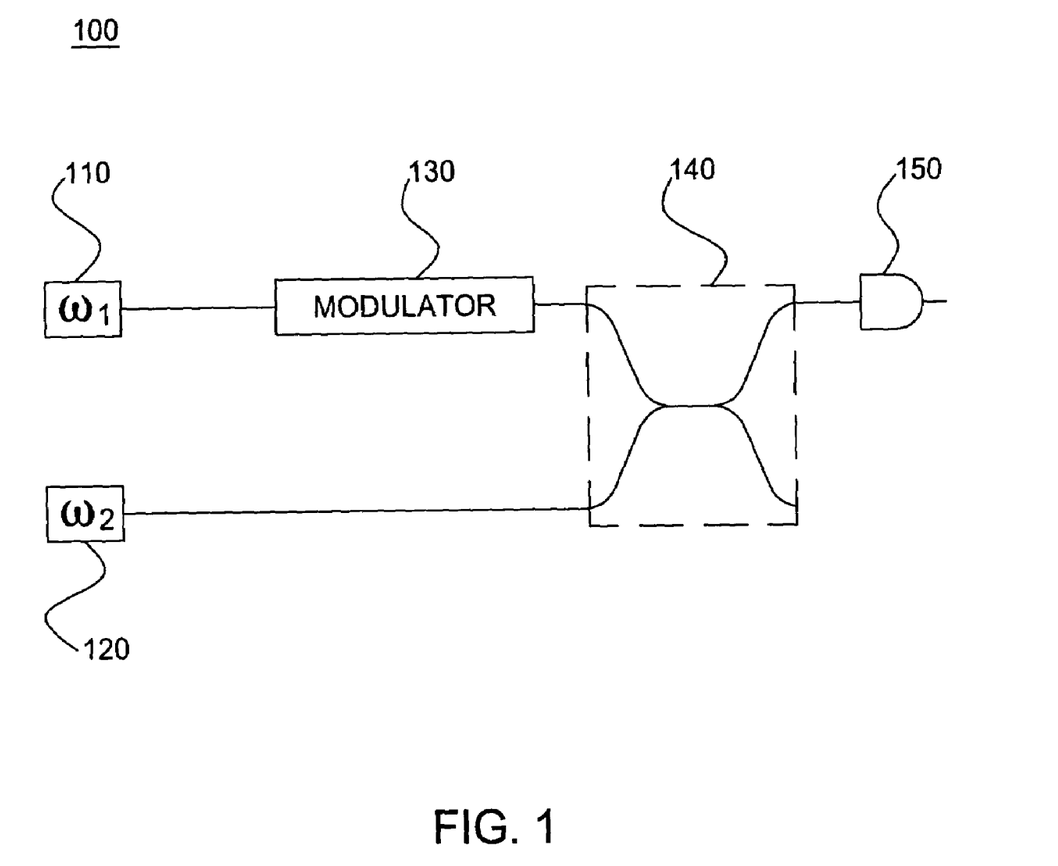
FIG. 1 depicts a block diagram of a heterodyne measuring arrangement according to an embodiment of the invention.

FIG. 1 depicts a block diagram of a heterodyne measuring arrangement according to an embodiment of the invention. The heterodyne arrangement 100 of FIG. 1 includes a first optical signal source 110, a second optical signal source 120, a temporal modulator under test 130, a coupler 140, and a photodetector and electronics 150.

The first optical signal source 110 is a monochromatic source at optical frequency $\omega_1$ with electric field $E_1 \cdot \exp(i\omega_1 t + \phi_1(t))$. The second signal source is another monochromatic source at optical frequency $\omega_2$ with electric field $E_2 \cdot \exp(i\omega_2 t + \phi_2(t))$. The signal sources are monochromatic lasers. In one embodiment, the monochromatic lasers at $\omega_1$ and $\omega_2$ can be provided by two tunable lasers. An example of such a laser is the Agilent 81689A tunable laser module. The source 110 with optical frequency $\omega_1$ is sent into the modulator 130.

The modulator 130 is driven by a stimulus (for example a RF sinewave), so that its complex transmission is R(t). The modulated output is represented by $E_1 \cdot R(t) \cdot \exp(i\omega_1 t + \omega_1(t))$. In one embodiment, the modulator is an electroabsorption modulator (EAM) such as an OKI C-band electroabsorption modulator (OM5642W-30B). The EAM can be biased and driven by a 10 MHz sinewave that spans voltages from −4 V to 0V. Other examples of modulators and devices that could be characterized using the teachings of the present invention include a Mach-Zehnder modulator or a phase modulator driven by a time-varying electrical signal, a semiconductor optical amplifier driven by a time-varying electrical signal or modulated by a time-varying optical signal propagating jointly with the first signal source in the semiconductor optical amplifier. These examples should not be considered as limiting the application of the present invention in any way, and it should be apparent that the concepts presented here can be applied to any situation where the properties of a time-varying device need to be measured.

The coupler 140 combines the modulated signal with the monochromatic reference source at optical frequency $\omega_2$. The coupler is any device that outputs a linear combination of the two input signals. This includes fiber-based and waveguide-based couplers. As the first and second signals have different optical frequencies $\omega_1$ and $\omega_2$, wavelength-dependent couplers such as those used in wavelength multiplexed systems could also be used.

The output signal from the coupler 140 is transmitted to photodetector and electronics 150. In one embodiment, photodetection is implemented using a 15 GHz photodetector followed by an AC-coupled 1 GHz amplifier. Any assembly of photodetector and electronics can be used provided that its bandwidth is sufficient to measure the intensity of the output signal from the coupler 140. The photodetector and electronics 150 temporally resolve the intensity S(t) of the output signal, leading to the signal $$S(t) = |E_1 \cdot R(t) \cdot \exp(i\omega_1 t + \phi_1(t)) + E_2 \cdot \exp(i\omega_2 t + \phi_2(t))|^2 \quad (1)$$

This signal can be developed as $$S(t)=|E_2|^2+|E_1 \cdot R(t)|^2+2 \cdot Re[E_1 \cdot E^*_2 \cdot R(t) \cdot \exp(i\Omega_{1,2}t+\phi_1(t)-\phi_2(t))] \quad (2)$$

with $\Omega_{1,2}=\omega_1-\omega_2$. In equation (2), the first term is a constant, the second term is proportional to the time-varying transmission of the modulator, and the third term has quickly varying fringes with period $2\pi/\Omega_{1,2}$. The difference frequency $\Omega_{1,2}=\omega_1-\omega_2$ is chosen so that the spectrum of the interferometric component does not overlap with the spectrum of the transmission of the modulator. This non-overlapping property allows the extraction of the interferometric component via Fourier processing by Fourier transforming the measured intensity, applying a filter on one of the sidebands located around the frequency $\Omega_{1,2}$ and inverse Fourier transforming to the time domain.

Figure 2:
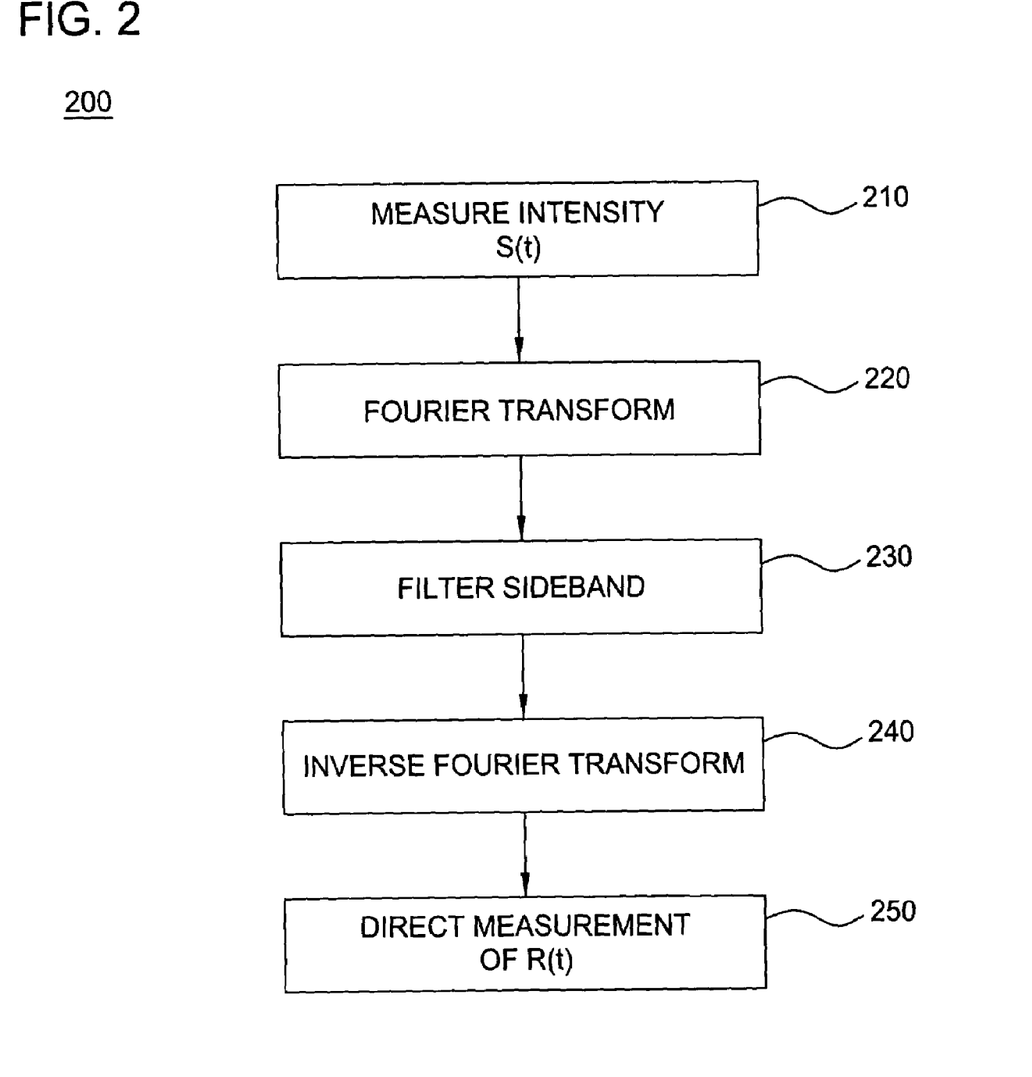
FIG. 2 depicts a flow diagram of a method according to an embodiment of the invention.

FIG. 2 depicts a flow diagram 200 of a method according to an embodiment of the invention. The signal S(t) represents the intensity of the combined sources at the output of the coupler 140, which is measured at step 210.

At step 220, a Fourier transform is performed on the intensity measured at step 210, and the representation of S(t) is obtained in the frequency domain. In the frequency domain, the transformed S(t) includes the Fourier transform of the various terms of Eq. (2). While the Fourier transform of the first two terms is located around the zero frequency, the Fourier transform of the last terms is composed of two sidebands around the frequency $\Omega_{1,2}$ and $-\Omega_{1,2}$.

At step 230, Filtering is performed on the transformed signal of step 220 to extract the sideband at frequency $\Omega_{1,2}$. This process is done through software or hardware.

At step 240, the filtered sideband signal in the frequency domain is Fourier transformed back into the time domain, i.e. one performs an inverse Fourier transform on the filtered sideband. This newly transformed signal yields the response of the modulator R(t). The filtered processed intensity signal leads to the complex quantity $E_1 \cdot E^*_2 \cdot R(t) \cdot \exp(i\Omega_{1,2}t+\phi_2(t)-\phi_2(t))$. The linear temporal phase $\Omega_{1,2}t$ is usually of no interest in identifying the response of the modulator. If the relative phase of the two sources $\phi_1-\phi_2$ is stable during the measurement time, the signal S(t) leads to the direct measurement of the complex function R(t) after removal of a linear fit to its phase. In case of instability in this phase, the complex function R(t) can still be retrieved after averaging of various determinations of the quantity $E_1 \cdot E^*_2 \cdot R(t) \cdot \exp(i\Omega_{1,2}t+\phi_2(t))$.

When performing these measurements, the photodetector and electronics need to have sufficient bandwidth to resolve the temporal fringes, and must therefore have bandwidth higher than $\Omega_{1,2}$. However, the photodetector and electronics 150 can be AC-coupled as the signal of interest is encoded on a carrier frequency. The relative phase between the two interfering sources 110, 120 must be stable during the measurement time, which means that their coherence time must be longer than the measurement time if the sources at $\omega_1$ and $\omega_2$ are not correlated. The use of Fourier processing on the measured signal S allows for increased versatility.

Figure 3:
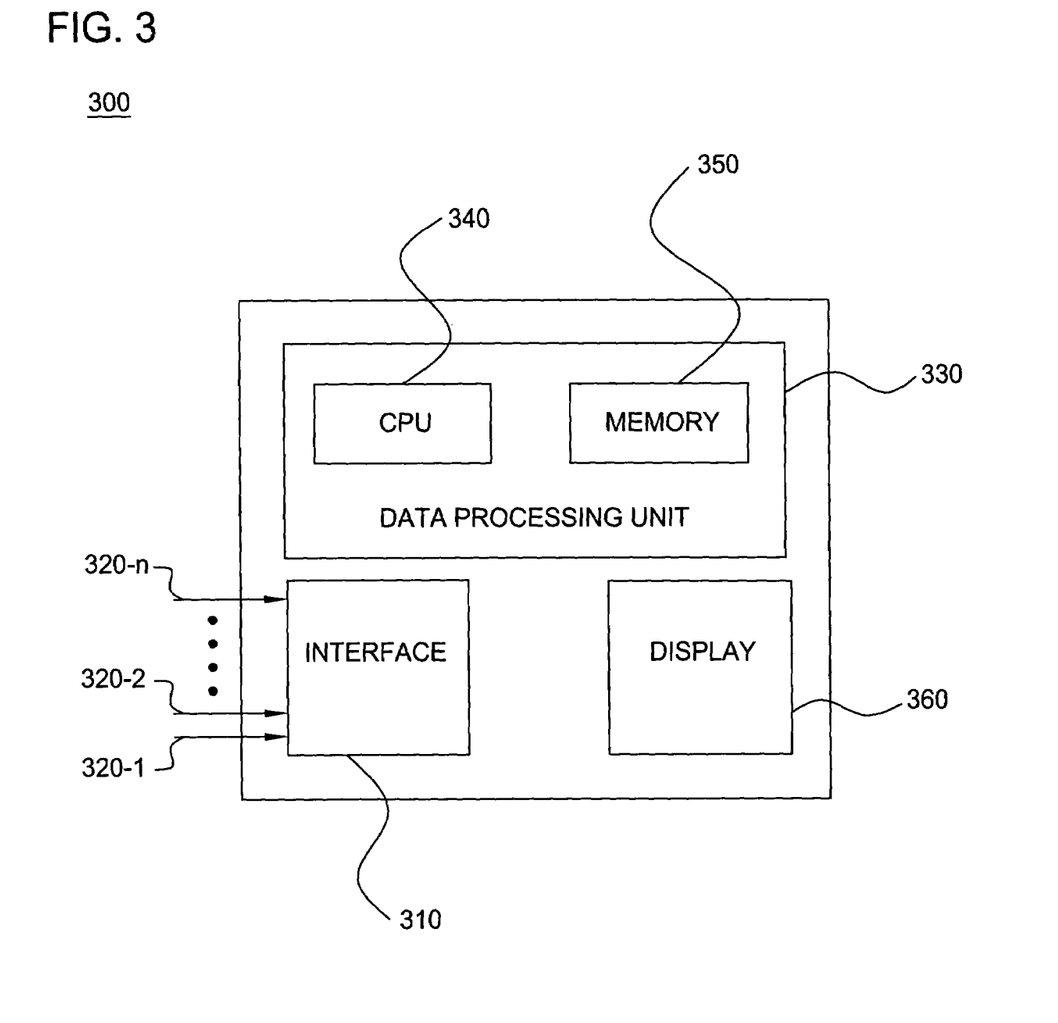
FIG. 3 depicts a block diagram of a measuring unit.

FIG. 3 depicts a block diagram of the measuring unit 300. The processing unit 300 includes an interface 310 for measuring signals (320-1, 320-2, 320-n) inputted into the measuring unit 300, a data processing unit 330 which includes a central processing unit (CPU) 340 and memory 350, and a display 360. The data processing unit 330 performs calculations on the measured signals, such as performing Fourier transform on the measured input. The calculation or other information from the data processing unit 330 can be graphically or symbolically shown using the display 360. For example, measurement of the signal of Eq. 1 and displaying of the response of the modulator may be achieved with an Infinium continuous sampling scope with a 1.5 GHz bandwidth, while the processing is performed with a personal computer. Other appropriate measurement units include analog-to-digital converter boards.

Figure 4:
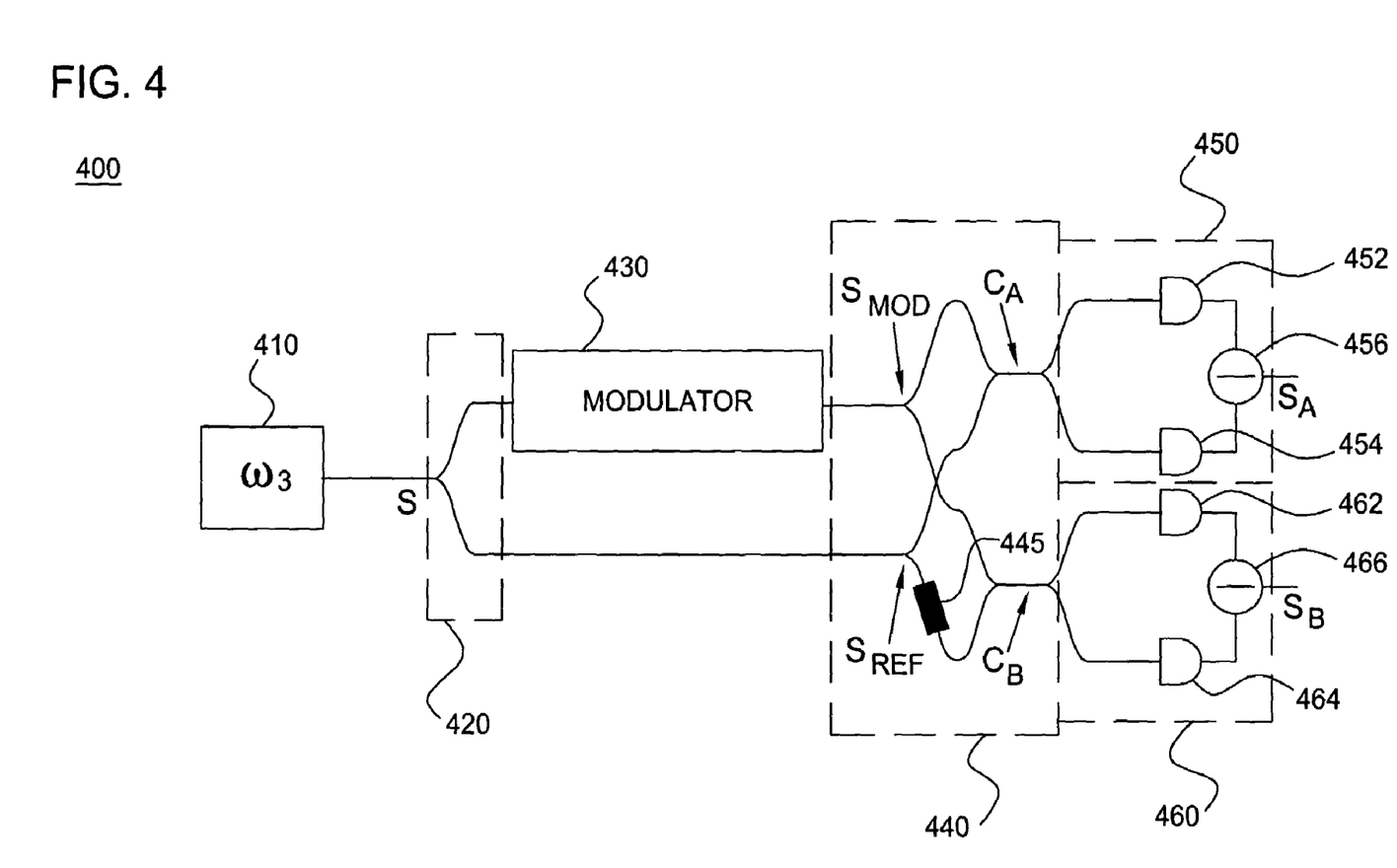
FIG. 4 depicts a block diagram of a homodyne measuring arrangement according to an embodiment of the invention.

FIG. 4 depicts a block diagram of a homodyne measuring arrangement according to an embodiment of the invention. The homodyne arrangement 400 includes a signal source 410, a splitter S 420, a temporal modulator under test 430, a 90° optical hybrid structure 440, and two balanced photodetector units 450, 460.

The optical signal source 410 is a monochromatic source at an optical frequency $\omega_3$. The signal produced by the source has an electric field represented by $E_3 \cdot \exp(i\omega_3 t+\phi_3(t))$. In one embodiment, the optical source 410 is implemented using an Agilent 81689A laser.

The source is sent to a splitter module 420 which includes a splitter S. Such splitting can be performed for example using fiber-based or waveguide-based couplers. Part of the light is sent to the modulator 430 to generate a modulated signal. The remaining part is sent directly to one of the input ports of the 90° optical hybrid structure 440 to act as a reference signal.

The temporal modulator 430 has a complex transmission R(t). In one embodiment, the modulator can be an electroabsorption modulator (EAM) such as an OKI C-band electroabsorption modulator (OM5642W-30B). The EAM can be biased and driven by a 10 MHz sinewave that spans voltages from −4 V to 0V. The modulated signal is sent to another input port of the optical hybrid structure 440. Other examples of modulators and devices that could be characterized using the teachings of the present invention include a Mach-Zehnder modulator or a phase modulator driven by a time-varying electrical signal, a semiconductor optical amplifier driven by a time-varying electrical signal or modulated by a time-varying optical signal propagating jointly with the first signal source in the semiconductor optical amplifier. These examples should not be considered limiting the application of the present invention in any way, and it should be apparent that the concepts presented here can be applied to any situation where the properties of a time-varying device need to be measured.

In one embodiment, the 90° optical hybrid structure 440 is a structure made of silica waveguides on a silicon substrate. Other implementations of such structure leading to substantially identical function include for example a polarization-based hybrid and a fiber-based hybrid. The hybrid structure 440 is configured to split the modulated signal at splitter $S_{MOD}$ into first and second modulated signals and configured to split the reference signal at splitter $S_{REF}$ into a first and second reference signals. The second reference signal is phase shifted by a $\pi/2$ phase shifter. Those skilled in the art will recognize that such phase shifter could be located in the optical path of any of the two modulated signals or in the optical path of any of the two reference signals. Additionally, a variable phase shifter might be used for more versatility. The hybrid structure 440 then recombines the first modulated beam and first reference beam at combiner $C_A$ and recombines the second modulated beam and second reference beam at combiner $C_B$. Each combiner $C_A$ and $C_B$ has two outputs that are sent to the two photodetectors of a balanced photodetector unit, respectively balanced photodetector unit 450 and 460, in order to perform dual-quadrature detection.

Two balanced photodetectors (450, 460) are connected to the two outputs of the two combiners ($C_A$ and $C_B$). An example of the balanced photodetector is the New Focus 800

MHz balanced detectors, but substantially identical operation would be obtained with any other balanced photodetector units having sufficient bandwidth. Each balanced photodetector unit includes two detectors (i.e. 452 and 454 for balanced photodetector unit 450 and 462 and 464 for balanced photodetector unit 460) and a subtracter (i.e. 456 and 466 respectively for the balanced photodetector unit 450 and 460). In an embodiment, the balanced photodetector 450 using detector 452 detects the sum of the intensity of the modulated signal, the intensity of the reference signal and the real part of the interference between the first modulated signal and first reference signal. The other detector 454 detects the sum of the intensity of the modulated signal, the intensity of the reference signal and the opposite of the real part of the interference between the modulated signal and reference signal. The difference of the signals from these two detectors is determined at the subtracter 456 where the real part of the interference between the first modulated signal and first reference signal $S_A(t)$ is outputted. The other balanced photodetector unit 460 functions in the same manner as the balanced photodetector unit 450. However, because of the phase shift of $\pi/2$, the subtracter 466 outputs the imaginary part of the interference between the modulated signal and reference signal $S_B(t)$.

When the phase of one of the signals of the hybrid is properly adjusted by a phase shifter 445, the signals measured by the two balanced photodetector units are respectively proportional to the real and imaginary part of the interference between the modulated signal and reference signal given by $$S_A(t) = \mathrm{Re}[|E_3|^2 \cdot R(t) \cdot \exp(i(\varphi_3(t) - \varphi_3(t-\tau)) + \varphi)] \quad (3)$$

$$S_B(t) = \mathrm{Im}[|E_3|^2 \cdot R(t) \cdot \exp(i(\varphi_3(t) - \varphi_3(t-\tau)) + \varphi)] \quad (4)$$

where $\tau$ is a delay due to the difference of the optical modulation path and the reference path and $\phi$ is a phase due to the difference of the modulation signal and reference signal. As mentioned above, the second reference signal is phase shifted. However, any one of the signal paths can be shifted by $\pi/2$ and get the desired outputs.

Figure 5:
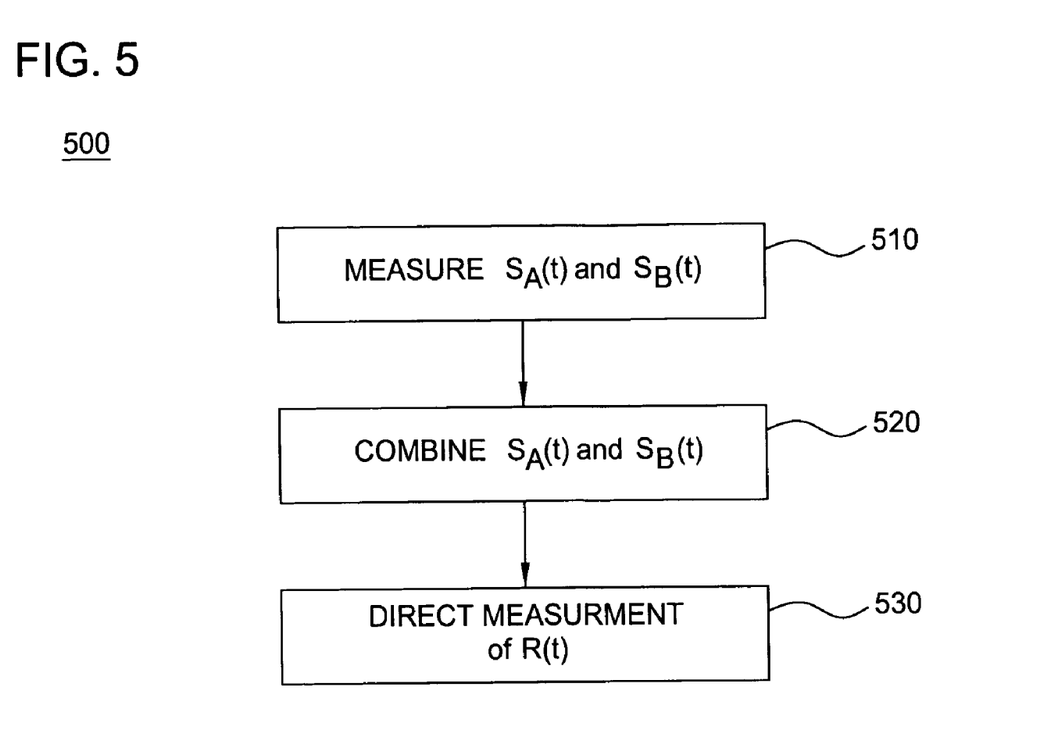
FIG. 5 depicts a flow diagram of a method according to an embodiment of the invention.

FIG. 5 depicts a flow diagram 500 of a method according to an embodiment of the invention. The measured signals $S_A(t)$ and $S_B(t)$ are the real and imaginary components of the interference, respectively. The measuring unit 300 of FIG. 3 also can be used to measure the response of the modulator 430 in the homodyne arrangement. It measures both components $S_A(t)$ and $S_B(t)$ of the interference 510. Then, the processing unit 330 of the measuring unit 300 will combine signals $S_A$ and $S_B$. The signals of Eq. 3 and 4 can be combined to give $|E_3|^2 \cdot R(t) \cdot \exp(i(\phi_3(t)-(t-\tau))+\phi)$. If the delay $\tau$ is significantly shorter than the coherence time of the monochromatic laser, $\phi_3(t)-\phi_3(t-\tau)$ is equal to zero. If the phase $\phi$ is stable during the measurement time, such technique therefore directly leads to the complex function R(t) describing the response of the modulator to the drive signal up to a non-significant constant phase. Averaging of multiple acquisitions of the combined signals $S_A$ and $S_B$ can be performed to get accurate determination of the function R(t) even when the phase $\phi$ is not stable during the measurement time or the delay $\tau$ is not significantly shorter than the coherence time of the monochromatic laser. In an embodiment, the signals $S_A$ and $S_B$ can be measured with the Infinium oscilloscope similar to that used in the heterodyne measurement. Other appropriate measurement units include analog-to-digital converter boards.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for characterizing an optical device, comprising:
   modulating a first optical signal having a first optical frequency using the optical device with complex transmission R(t) to produce a modulated optical signal;
   combining the modulated optical signal with a second optical signal having a second optical frequency to produce thereby a combined optical signal, wherein the first optical frequency and the second optical frequency are selected such that the difference between the first optical frequency and the second optical frequency does not overlap with a spectrum of transmission of the optical device; and
   measuring the intensity of the combined optical signal to determine thereby the complex transmission R(t).

2. The method of claim 1, wherein the intensity of the combined optical signals is represented by:

$$|E_2|^2 + |E_1 \cdot R(t)|^2 + 2 \cdot \mathrm{Re}[E_1 \cdot E^*_2 \cdot R(t) \cdot \exp(i\Omega_{1,2}t + \phi_1(t) - \phi_2(t))].$$

3. The method of claim 1, wherein the complex transmission R(t) is determined by
   Fourier transforming the combined optical signal to produce thereby a Fourier transformed signal;
   filtering a sideband of the Fourier transformed signal to produce thereby a filtered signal; and
   inverse Fourier transforming the filtered signal to produce thereby an inverse Fourier transform.

4. The method of claim 3, wherein the inverse Fourier transform of the filtered signal is represented by:

$$E_1 \cdot E^*_2 \cdot R(t) \cdot \exp(i\Omega_{1,2}t + \phi_1(t) - \phi_2(t)).$$

5. A method for characterizing an optical device comprising:
   splitting a source optical signal into a first optical signal and a reference signal;
   modulating the first optical signal using the optical device with complex transmission R(t) to produce a modulated first optical signal;
   splitting the modulated first optical signal into a first split modulated signal and a second split modulated signal;
   splitting the reference signal to produce a first split reference signal and a second split reference signal;
   combining the first split modulated signal with the first split reference signal thereby producing a fifth and sixth signals;
   combining the second split modulated signal with the second split reference signal thereby producing a seventh and eighth signals;
   measuring the intensity of the fifth and sixth signals;
   subtracting the measured intensity of the fifth and sixth signals thereby producing a first electrical signal;
   measuring the intensity of the seventh and eighth signals;
   subtracting the measured intensity of the seventh and eighth signals thereby producing a second electrical signal; and
   combining the first and second electrical signals, wherein the combined first and second electrical signals represents the response of the optical device.

6. The method of claim 5, wherein the optical device is connected to an optical hybrid structure.

7. The method of claim 6, wherein the optical hybrid structure includes a phase shifter.

8. The method of claim 5, wherein the first electrical signal is represented by $Re[|E_3|^2 \cdot R(t) \cdot exp(i(\phi_3(t)-\phi_3(t-\tau))+\phi)]$.

9. The method of claim 5, wherein the second electrical signal is represented by $Im[|E_3|^2 \cdot R(t) \cdot exp(i(\phi_3(t)-\phi_3(t-\tau))+\phi)]$.

10. The method of claim 5, wherein the combined first and second electrical signals is represented by $$|E_3|^2 \cdot R(t) \cdot exp(i(\phi_3(t)-\phi_3(t-\tau))+\phi).$$

11. The method of claim 5, further comprising: measuring the interference of the first optical signal and the reference signal.

12. The method of claim 5, further comprising: connecting two balanced photodetector units to the outputs of the optical hybrid structure.

13. The method of claim 12, wherein each balanced photodetector unit comprises two photodetectors and a subtracter.

14. An apparatus for characterizing an optical device comprising:
   an optical device for modulating a first optical signal having a first optical frequency to produce a modulated first optical signal;
   a coupler for combining the modulated first optical signal with a second optical signal having a second optical frequency to produce thereby a combined optical signal, wherein the first optical frequency and the second optical frequency are selected such that the difference between the first optical frequency and the second optical frequency does not overlap with a spectrum of transmission of the optical device; and
   a photodetector and electronics for measuring the intensity of the combined optical signal.

15. An apparatus for characterizing an optical device comprising:
   a splitter for splitting a source optical signal into a first optical signal and a reference signal;
   an optical device for modulating the first optical signal to produce a modulated first optical signal;
   an optical hybrid structure for splitting both the modulated first signal and the reference signal and for producing a fifth, sixth, seventh and eighth optical signals;
   a group of photodetectors for measuring the intensity of the fifth, sixth, seventh and eighth optical signals
   a first subtracter for subtracting the intensity of the fifth and sixth optical signals thereby producing a first electrical signal;
   a second subtracter for subtracting the intensity of the seventh and eighth signals thereby producing a second electrical signal;
   a measuring device for combining the first and second electrical signals, wherein the combined first and second electrical signals represent the response of the optical device.

16. The apparatus of claim 15, wherein the hybrid structure comprises:
   a splitter for splitting the modulated first optical signal into a first split modulated signal and a second split modulated signal;
   a splitter for splitting the reference signal to produce a first split reference signal and a second split reference signal;
   a first combiner for combining the first split modulated signal with the first split reference signal thereby producing the fifth and sixth optical signals; and
   a second combiner for combining the second split modulated signal with the second split reference signal thereby producing the seventh and eighth signals.

17. The apparatus of claim 15, wherein the optical hybrid structure includes a phase shifter.

* * * * *

UNITED STATES PATENT AND TRADEMARK OFFICE
CERTIFICATE OF CORRECTION

PATENT NO. : 7,609,385 B2
APPLICATION NO. : 11/206622
DATED : October 27, 2009
INVENTOR(S) : Christophe J. Dorrer Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this

Twelfth Day of October, 2010

David J. Kappos
*Director of the United States Patent and Trademark Office*